(12) United States Patent
Van der Walt et al.

(10) Patent No.: US 11,852,376 B2
(45) Date of Patent: Dec. 26, 2023

(54) DEVICES, SYSTEMS, FACILITIES AND PROCESSES FOR $CO_2$ CAPTURE/SEQUESTRATION AND DIRECT AIR CAPTURE

(71) Applicant: NEXT CARBON SOLUTIONS, LLC, Houston, TX (US)

(72) Inventors: Ivan Van der Walt, Conroe, TX (US); Ben Heichelbech, Houston, TX (US); Connor Rivard, Houston, TX (US); Vikrum Subra, Houston, TX (US)

(73) Assignee: NEXT CARBON SOLUTIONS, LLC, Houston, TX (US)

( * ) Notice: Subject to any disclaimer, the term of this patent is extended or adjusted under 35 U.S.C. 154(b) by 0 days.

(21) Appl. No.: 18/121,379

(22) Filed: Mar. 14, 2023

(65) Prior Publication Data

US 2023/0296271 A1    Sep. 21, 2023

Related U.S. Application Data

(60) Provisional application No. 63/319,910, filed on Mar. 15, 2022.

(51) Int. Cl.
*F24F 8/10* (2021.01)
*B01D 53/00* (2006.01)
(Continued)

(52) U.S. Cl.
CPC .............. *F24F 8/10* (2021.01); *B01D 53/002* (2013.01); *B01D 53/26* (2013.01); *F24F 1/0059* (2013.01);
(Continued)

(58) Field of Classification Search
CPC ........ F24F 8/10; F24F 1/0059; B01D 53/002; B01D 53/26; B01D 2257/504; B01D 2257/80
See application file for complete search history.

(56) References Cited

U.S. PATENT DOCUMENTS

| 4,249,915 A | 2/1981 | Sircar et al. |
| 6,048,509 A | 4/2000 | Kawai et al. |

(Continued)

FOREIGN PATENT DOCUMENTS

| WO | WO2014/073004 A2 | 5/2014 |
| WO | WO2022/13197 A1 | 1/2022 |
| WO | WO2022/050918 A1 | 3/2022 |

OTHER PUBLICATIONS

International Preliminary Report on Patentability and Written Opinion from PCT/US2020/051269, dated Mar. 8, 2023, 16 pages.

(Continued)

*Primary Examiner* — Kun Kai Ma
(74) *Attorney, Agent, or Firm* — K&L Gates LLP

(57) ABSTRACT

Devices, systems, facilities, and processes for direct air capture combined with carbon capture for reducing the overall emissions are disclosed herein. An exemplary system may include a first air blower configured to move a $CO_2$ containing gas through a carbon capture unit; the carbon capture unit configured to separate and capture $CO_2$ from the $CO_2$ containing gas to generate a first $CO_2$ rich stream; a second air blower configured to move an air from an air-cooled heat exchanger to a direct air capture unit; the direct air capture unit configured to capture $CO_2$ from the air from the air-cooled heat exchanger to generate a second $CO_2$ rich stream; and a sequestration compression unit configured to compress the first and second $CO_2$ rich streams.

12 Claims, 1 Drawing Sheet

(51) Int. Cl.
   *F24F 1/0059*   (2019.01)
   *B01D 53/26*   (2006.01)
(52) U.S. Cl.
   CPC .... *B01D 2257/504* (2013.01); *B01D 2257/80* (2013.01)

(56) References Cited

U.S. PATENT DOCUMENTS

| | | |
|---|---|---|
| 6,248,794 B1 | 6/2001 | Gieskes |
| 9,102,534 B2 | 8/2015 | McKenna |
| 9,149,761 B2 | 10/2015 | Northrop et al. |
| 10,315,150 B2 | 6/2019 | Huntington et al. |
| 11,067,335 B1 | 7/2021 | Van der Walt et al. |
| 11,112,174 B1 * | 9/2021 | Van der Walt .......... F25J 1/0022 |
| 11,161,076 B1 * | 11/2021 | Van der Walt ..... B01D 53/1425 |
| 11,484,825 B1 | 11/2022 | Heichelbech et al. |
| 2003/0192343 A1 | 10/2003 | Wilding et al. |
| 2010/0139484 A1 * | 6/2010 | Li .................. B01D 53/62 95/42 |
| 2010/0325958 A1 * | 12/2010 | Molaison ............... C10K 1/005 48/128 |
| 2014/0053565 A1 | 2/2014 | Galasso et al. |
| 2014/0053761 A1 | 2/2014 | Galasso |
| 2016/0059180 A1 | 3/2016 | Hamad |
| 2016/0289080 A1 * | 10/2016 | Dube ................. B01D 53/1493 |
| 2016/0369674 A1 | 12/2016 | Younes et al. |
| 2017/0097189 A1 | 4/2017 | Guy et al. |
| 2017/0333814 A1 | 11/2017 | Yancy et al. |
| 2018/0094560 A1 | 4/2018 | Williams et al. |
| 2021/0121826 A1 | 4/2021 | Kolodji |
| 2022/0062821 A1 * | 3/2022 | Van der Walt ..... B01D 53/1425 |
| 2022/0065160 A1 | 3/2022 | Van der Walt et al. |
| 2022/0305434 A1 | 9/2022 | Van der Walt et al. |

OTHER PUBLICATIONS

International Preliminary Report on Patentability and Written Opinion from PCT/US2021/046817, dated Mar. 8, 2023, 4 pages.
International Preliminary Report on Patentability and Written Opinion from PCT/US2020/046879, dated Mar. 8, 2023, 7 pages.
IEAGHG Technical Report by IEA, Techno-Economic Evaluation of CO2 Capture in LNG Plants, IEA Greenhouse Gas R&D Programme, Oct. 2019, 198 pages.
Third Party Observation from PCT/US2020/051269, Filed Sep. 17, 2020, listing the IEAGHG Technical Report, 1 page.
Supplemental Explanation for Third Party Observation from PCT/US2020/051269, Filed Sep. 17, 2020, regarding the IEAGHG Technical Report, 4 pages.
Third Party Observation from PCT/US2021/046716, Filed Aug. 19, 2021, listing the IEAGHG Technical Report, 1 page.
Supplemental Explanation for Third Party Observation from PCT/US2021/046716, Filed Aug. 19, 2021, regarding the IEAGHG Technical Report, 3 pages.
International Search Report from PCT/US2022/53201, dated Mar. 27, 2023, 2 pages.
International Written Opinion from PCT/US2022/53201, dated Mar. 27, 2023, 4 pages.
International Preliminary Report on Patentability and Written Opinion from PCT/US2020/046879, dated Mar. 8, 2023, 6 pages.
International Search Report from PCT/US2023/15194, dated Jun. 15, 2023, 2 pages.
International Written Opinion from PCT/US2023/15194, dated Jun. 15, 2023, 4 pages.
International Search Report from PCT/US2023/15375, dated Jun. 14, 2023, 2 pages.
International Written Opinion from PCT/US2023/15375, dated Jun. 14, 2023, 6 pages.

\* cited by examiner

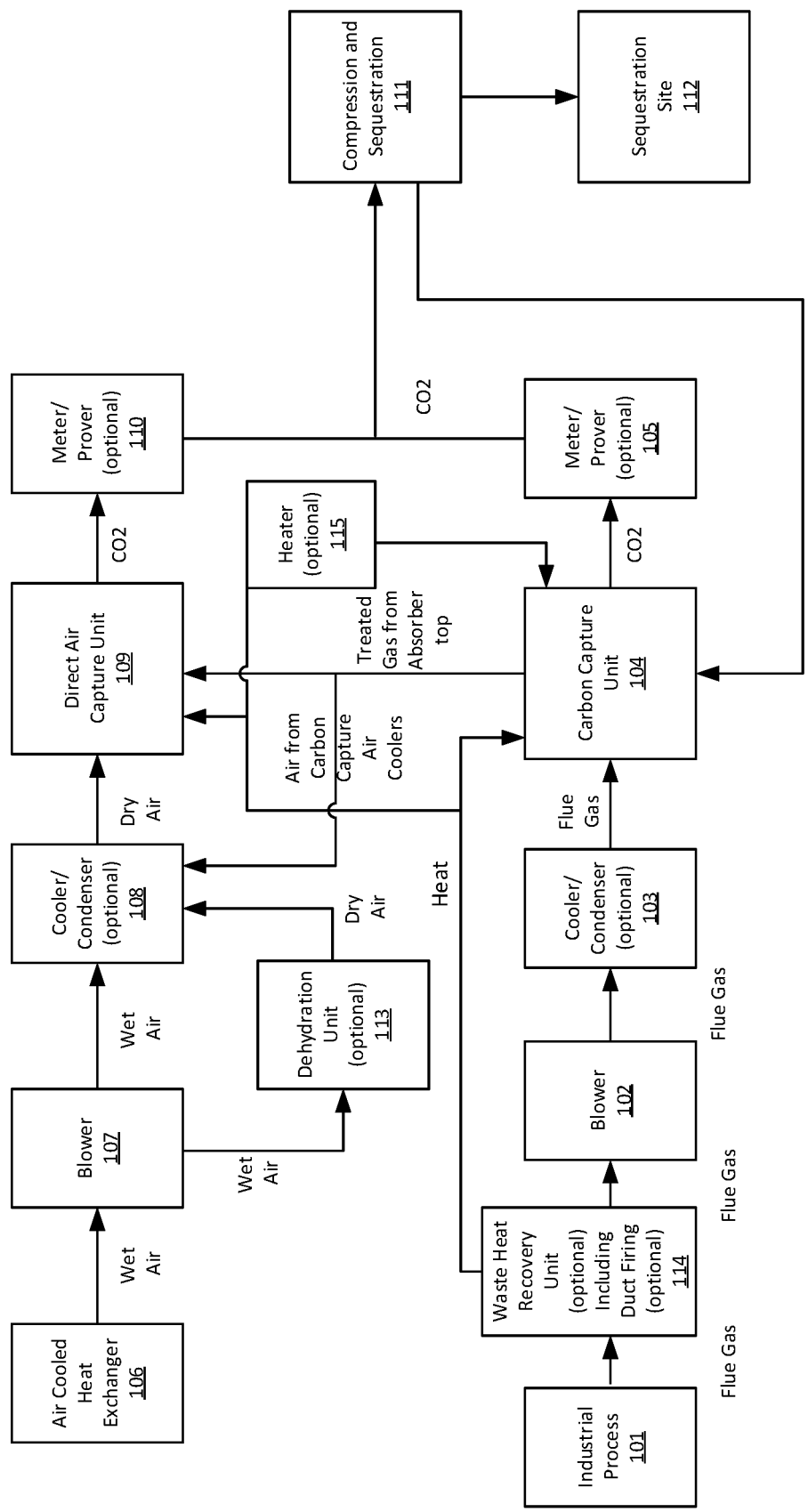

US 11,852,376 B2

DEVICES, SYSTEMS, FACILITIES AND PROCESSES FOR CO₂ CAPTURE/SEQUESTRATION AND DIRECT AIR CAPTURE

CROSS REFERENCE TO RELATED APPLICATIONS

The present application claims priority to U.S. Provisional Application No. 63/319,910, filed on Mar. 15, 2022, the entire content of which is being incorporated herein by reference.

BACKGROUND

Industrial facilities contribute to greenhouse gases through various processes. Greenhouse gases comprise various gaseous components such as carbon dioxide, methane, nitrous oxide, hydrofluorocarbons, perfluorocarbons, and sulfur hexafluoride, which absorb radiation, trap heat in the atmosphere and generally contribute to undesirable environmental greenhouse effects.

Industrial facilities often implement certain forms of emission reduction technologies such as scrubbers and flares. However, these facilities typically do not have a dedicated process specifically designed to reduce most greenhouse gas emissions as well as implement synergies to reduce the cost of direct air capture.

SUMMARY

The present disclosure provides devices, systems, facilities and processes that enable industrial facilities to improve the overall efficiency of the facility and reduce greenhouse gas emissions.

In light of the disclosure herein and without limiting the scope of the disclosure in any way, in an aspect of the present disclosure, which may be combined with any other aspect listed herein unless specified otherwise, an industrial facility may include a certain flue/process gas stream from the facility which contains a concentration of $CO_2$ which typically would be released to the atmosphere. Additionally, the facility may contain one or more air coolers as part of the process which use ambient air as a cooling medium for the industrial process.

In an aspect of the present disclosure, which may be combined with any other aspect listed herein unless specified otherwise, the industrial flue/process stream may be sent to a blower to drive the stream to a cooler/condenser.

In an aspect of the present disclosure, which may be combined with any other aspect listed herein unless specified otherwise, the flue gas may be cooled and the water may be removed at the cooler/condenser before being sent to a carbon capture unit.

In an aspect of the present disclosure, which may be combined with any other aspect listed herein unless specified otherwise, the carbon capture unit may include a commercially available absorbing media for $CO_2$, such as amine, ammonia, ionic fluids, sodium carbonate, methanol, potassium chloride, and/or any other commercially available solvents. The carbon capture unit may include an absorber for absorbing $CO_2$. The treated gas from the top of the absorber column in the carbon capture unit may be sent to the inlet of a direct air capture unit.

This treated gas stream may contain less than about 20% $CO_2$ of the initial flue gas stream. This carbon capture unit may use any commercially available adsorption or membrane-based $CO_2$ removal technology. The carbon capture unit may generate a $CO_2$ rich gas stream. The air from the air coolers at the carbon capture unit may be sent to the cooler/condenser upstream of the direct air capture unit.

In an aspect of the present disclosure, which may be combined with any other aspect listed herein unless specified otherwise, the $CO_2$ rich gas stream from the carbon capture unit is further processed and sent to the sequestration compressor unit to be compressed and sequestered.

In an aspect of the present disclosure, which may be combined with any other aspect listed herein unless specified otherwise, the air from the industrial facility air cooled heat exchanger may be sent to a blower to drive the stream to a cooler/condenser In an aspect of the present disclosure, which may be combined with any other aspect listed herein unless specified otherwise, the wet ambient air may be cooled and the water may be removed at the cooler/condenser before being sent to the direct air capture unit.

In an aspect of the present disclosure, which may be combined with any other aspect listed herein unless specified otherwise, the direct air capture unit may include a commercially available absorbing media for $CO_2$, such as amine, ammonia, ionic fluids, sodium carbonate, methanol, potassium chloride, and/or any other industrially available solvents, and an absorber for absorbing $CO_2$. The treated gas from the top of the absorber column may be sent to atmosphere. The direct air capture unit may use any commercially available adsorption or membrane-based $CO_2$ removal technology.

In an aspect of the present disclosure, which may be combined with any other aspect listed herein unless specified otherwise, the $CO_2$ captured from the direct air capture unit may be sent to a meter/prover in order to differentiate the $CO_2$ derived from direct air capture.

In an aspect of the present disclosure, which may be combined with any other aspect listed herein unless specified otherwise, the $CO_2$ rich stream from the meter/prover may be combined with the $CO_2$ rich stream from the carbon capture unit, upstream of the $CO_2$ compressor.

In an aspect of the present disclosure, which may be combined with any other aspect listed herein unless specified otherwise, the combined $CO_2$ streams may be compressed and sent to be sequestered.

In some embodiments, a system according to the present disclosure may comprise a first air blower configured to move a $CO_2$ containing gas through a carbon capture unit; the carbon capture unit configured to separate and capture $CO_2$ from the $CO_2$ containing gas to generate a first $CO_2$ rich stream; a second air blower configured to move an air from an air-cooled heat exchanger to a direct air capture unit; the direct air capture unit configured to capture $CO_2$ from the air from the air-cooled heat exchanger to generate a second $CO_2$ rich stream; and a sequestration compression unit configured to compress the first and second $CO_2$ rich streams.

In some embodiments, the system may further comprise at least one meter configured to measure a content of $CO_2$ in at least one of the first $CO_2$ rich stream or the second $CO_2$ rich stream.

In some embodiments, the system may further comprise a first cooler configured to cool the air from the air from the air-cooled heat exchanger and/or a first condenser configured to condense the air from the air from the air-cooled heat exchanger before the air from the air from the air-cooled heat exchanger reaches the direct air capture unit.

In some embodiments, the system may further comprise a second cooler configured to cool the $CO_2$ containing gas and/or a second condenser configured to condense the $CO_2$ containing gas before the air from the air from the $CO_2$ containing gas reaches the carbon capture unit.

In some embodiments, the system may further comprise a dehydration unit to remove water from the air from the air-cooled heat exchanger.

In some embodiments, the sequestration compression unit may be configured to convey the compressed first and second $CO_2$ rich streams to a sequestration site.

In some embodiments, the system may further comprise a duct firing unit in a waste heat recovery unit downstream of the facility turbine or fired heater used in the industrial process to increase the temperature and mass flow of the flue gas.

In some embodiments, the system may further comprise a waste heat recovery unit configured to recover heat from the industrial process and to provide the recovered heat to at least one of the carbon capture unit or the direct air capture unit.

In some embodiments, at least one of the first cooler, the second cooler, or the air-cooled heat exchanger may be a direct contact cooler.

In some embodiments, at least one of the first cooler, the second cooler, or the air-cooled heat exchanger may be a gas to air exchanger.

In some embodiments, the system may comprise a gas to air exchanger configured to cool a hot flue gas from the waste heat recovery unit.

In some embodiments, the gas to air exchanger may be configured to cool the hot flue gas from the waste heat recovery unit with a flow of ambient air. The flow of ambient air may be a counter flow of ambient air from an existing air cooler configured to cool a gas or liquid in the industrial process.

In some embodiments, the cooled flue gas may be sent to the second air blower and onward to the direct air capture unit.

In some embodiments, the existing air cooler may be additional to or separate from any or all of the first cooler, the second cooler, and the air-cooled heat exchanger. The existing air cooler may be a gas to air exchanger or a direct contact cooler.

In some embodiments, at least one of the first cooler, the second cooler, the air-cooled heat exchanger or the existing air cooler may be electric or steam driven.

In some embodiments, the system may further comprise a heater to provide heat to at least one of the carbon capture unit or the direct air capture unit.

In some embodiments, the sequestration compressor unit may comprise a gas driven compressor, and a flue gas from the gas driven compressor may be sent to the carbon capture unit.

Each aspect, feature, and/or embodiment of the present disclosure may be combined with any other aspect, feature, and/or embodiment of the present disclosure unless specified otherwise.

Additional features and advantages of the disclosed devices, systems, and processes are described in and will be apparent from the following detailed description and the FIGURES. The features and advantages described herein are not all-inclusive and in particular many additional features and advantages will be apparent to one of ordinary skill in the art in view of the FIGURES and description. Also, any particular embodiment does not have to have all of the advantages listed herein. Moreover, it should be noted that the language used in the specification has been principally selected for readability and instructional purposes and not to limit the scope of the disclosed subject matter.

BRIEF DESCRIPTION OF THE FIGURES

Understanding that the FIGURES depict only typical embodiments of the disclosure and are not to limit the scope of the present disclosure, the present disclosure is described and explained with additional specificity and detail through the use of the accompanying FIGURES. The FIGURES are listed below.

FIG. 1 illustrates an exemplary schematic of a combined direct air capture and carbon capture facility with the $CO_2$ rich gas from the facility being sent to sequestration/storage.

DETAILED DESCRIPTION

The detailed description is exemplary only and does not describe every possible embodiment, as describing every possible embodiment would be impractical, if not impossible. One of ordinary skill in the art could implement numerous alternate embodiments, which would still fall within the scope of the present disclosure. Unless a term is expressly defined herein, there is no intent to limit the meaning of that term beyond its plain or ordinary meaning. To the extent that any term is referred to in a manner consistent with a single meaning, that is done for the sake of clarity only, and it is not intended that such term be limited to that single meaning.

All percentages expressed herein are by weight of the total weight of the composition unless expressed otherwise. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this disclosure and the appended claims, the singular forms "a," "an" and "the" include plural referents unless the context clearly dictates otherwise. Thus, for example, reference to "an ingredient or "the ingredient" means "at least one ingredient" and includes two or more ingredients.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified. A composition "consisting essentially of" contains at least 75 wt. % of the referenced components, preferably at least 85 wt. % of the referenced components, more preferably at least 95 wt. % of the referenced components, most preferably at least 98 wt. % of the referenced components.

The terms "at least one of" and "and/or" used in the respective context of "at least one of X or Y" and "X and/or Y" should be interpreted as "X," or "Y," or "X and Y." For example, "at least one of honey or chicory root syrup" should be interpreted as "honey without chicory root syrup," or "chicory root syrup without honey," or "both honey and chicory root syrup."

Where used herein, the terms "example" and "such as," particularly when followed by a listing of terms, are merely exemplary and illustrative and should not be deemed to be exclusive or comprehensive.

FIG. 1 illustrates an exemplary schematic of a direct air capture and carbon capture facility 100 with the flue gas from the facility being sent to sequestration/storage.

A $CO_2$ containing gas stream generated from an industrial process, a process gas, or a flue gas 101 typically may be the result of combustion and/or processing of hydrocarbons and contain between about 2% and about 40% $CO_2$. The industrial process may be any industrial process that generates a $CO_2$ containing gas stream. The industrial process may be an LNG process. This gas stream may be sent to a waste heat recovery unit 114 to remove heat energy from the gas stream. The gas stream may then be sent to a blower 102. The blower 102 may drive this gas stream to a cooler and/or a condenser 103 to be cooled and/or condensed.

The gas stream driven by blower 102 or the cooled/condensed gas stream from the cooler/condenser 103 may be sent to a carbon capture unit 104 for $CO_2$ removal from the gas stream to generate a $CO_2$ rich stream. The $CO_2$ may be captured through a commercially available capture process in the carbon capture unit 104.

The $CO_2$ rich stream from the carbon capture unit 104 may be sent to a meter or prover 105 to be measured before being sent to a sequestration compression unit 111 for compression. The sequestration compression unit 111 may then send the compressed $CO_2$ rich stream to a sequestration site 112.

The ambient air used for cooling various plant processes may be sent to one or more air-cooled heat exchangers 106. The air downstream of the one or more air-cooled heat exchangers 106 may be a wet air. The air from the one or more air-cooled heat exchangers 106 may be collected in ducting and sent to a blower 107. The blower 107 may drive the air from the one or more air-cooled heat exchangers 106 to a cooler/condenser 108. The cooled/condensed air may be a dry air. The dry air may be sent to a direct air capture unit 109.

There may be a dehydration unit 113 upstream of the cooler/condenser 108 and/or the direct air capture unit 109. The blower 107 may drive the air from the one or more air-cooled heat exchangers 106 to the dehydration unit 113 to dry the air before sending the dry air to the cooler/condenser 108 and/or the direct air capture unit 109.

The air from the carbon capture Unit 104 may also be sent to the cooler/condenser 108 and then further sent to the direct air capture unit 109. Alternatively or additionally, the air from the carbon capture Unit 104 may be sent to the direct air capture unit 109 directly. The cooler/condenser 109 may be separate from the cooler/condenser 103.

The direct air capture unit 109 may be configured to capture $CO_2$ from the air from the one or more air-cooled heat exchangers 106 to generate a $CO_2$ rich stream. The $CO_2$ rich stream from the carbon capture unit 104 and the $CO_2$ rich stream generated from the air capture unit 109 may be combined together before being sent to the sequestration compressor 111 to be compressed and sequestrated.

The $CO_2$ rich stream generated from the direct air capture unit 109 may be sent to a meter/prover 110 to be measured and then combined with the $CO_2$ from the meter/prover 105.

The sequestration compressor 111 may be configured to compress the $CO_2$ rich stream generated from at least one of the carbon capture unit 104 or the direct air capture unit 109. The sequestration compressor 111 may be configured to convey the compressed $CO_2$ rich streams to a sequestration site.

The sequestration compressor 111 may comprise a gas driven compressor. A flue gas from the gas driven compressor may be sent to the carbon capture unit 104.

The waste heat recovery unit 114 may be configured to recover heat from the industrial process 114 and to provide the recovered heat to at least one of the carbon capture unit or the direct air capture unit. The waste heat recovery unit 114 may comprise duct firing to produce additional heat in the waste heat recovery unit.

There may be a heater 115 configured to provide heat to at least one of the carbon capture unit or the direct air capture unit.

At least one of the coolers 103, 108, or the air-cooled heat exchanger 106 may be a gas to air exchanger configured to cool a hot flue gas from the waste heat recovery unit 114.

The gas to air exchanger may be configured to cool the hot flue gas from the waste heat recovery unit 114 with a flow of ambient air. The cooled flue gas may be sent to the air blower 107 and onward to the direct air capture unit 107.

The flow of ambient air may be a counter flow of ambient air from an existing air cooler configured to cool a gas or liquid in the industrial process 101. The existing air cooler may be additional to or separate from any or all of the coolers 103, 108, and the air-cooled heat exchanger 106.

At least one of the coolers 103, 108, the air-cooled heat exchanger 106, or the existing air cooler may be a gas to air exchanger or a direct contact cooler. At least one of the coolers 103, 108, the air-cooled heat exchanger 106, or the existing air cooler may be electric or steam driven.

Each aspect, feature, and/or embodiment of the present disclosure may be combined with any other aspect, feature, and/or embodiment of the present disclosure unless specified otherwise.

The many features and advantages of the present disclosure are apparent from the written description. Further, since numerous modification and changes will readily occur to those skilled in the art, the present disclosure is not limited to the exact construction and operation as illustrated and described. Therefore, the described embodiments should be taken as illustrative and not restrictive, and the disclosure should not be limited to the details given herein. Each aspect of the present disclosure may be combined with any other aspect described herein unless specified otherwise.

The invention claimed is:

1. A system comprising:
   a first air blower configured to move a $CO_2$ containing gas through a carbon capture unit;
   the carbon capture unit configured to separate and capture $CO_2$ from the $CO_2$ containing gas to generate a first $CO_2$ rich stream;
   a second air blower configured to move an air from an air-cooled heat exchanger to a direct air capture unit;
   the direct air capture unit configured to capture $CO_2$ from the air from the air-cooled heat exchanger to generate a second $CO_2$ rich stream; and
   a sequestration compressor configured to compress the first and second $CO_2$ rich streams.

2. The system of claim 1 further comprising at least one meter configured to measure a content of $CO_2$ in at least one of the first $CO_2$ rich stream or the second $CO_2$ rich stream.

3. The system of claim 1 further comprising a first cooler configured to cool the air from the air from the air-cooled heat exchanger and/or a first condenser configured to condense the air from the air from the air-cooled heat exchanger before the air from the air from the air-cooled heat exchanger reaches the direct air capture unit.

4. The system of claim 3 further comprising a second cooler configured to cool the $CO_2$ containing gas and/or a second condenser configured to condense the $CO_2$ containing gas before the air from the air from the $CO_2$ containing gas reaches the carbon capture unit.

5. The system of claim 4, wherein at least one of the first cooler, the second cooler, or the air-cooled heat exchanger may be a direct contact cooler.

6. The system of claim 1 further comprising a dehydration unit to remove water from the air from the air-cooled heat exchanger.

7. The system of claim 1, wherein the sequestration compressor is configured to convey the compressed first and second $CO_2$ rich streams to a sequestration site.

8. The system of claim 1 further comprising a waste heat recovery unit configured to recover heat from at least one of an industrial process or the sequestration compressor, and the waste heat recovery unit is further configured to provide the recovered heat to at least one of the carbon capture unit or the direct air capture unit.

9. The system of claim 8, wherein the waste heat recovery unit comprises a duct firing unit configured to increase at least one of a temperature or a mass flow of the $CO_2$ containing gas.

10. The system of claim 8 comprising a gas to air exchanger configured to cool a hot flue gas from the waste heat recovery unit.

11. The system of claim 1 further comprising a heater configured to provide heat to at least one of the carbon capture unit or the direct air capture unit.

12. The system of claim 1, wherein the sequestration compressor comprises a gas driven compressor, and a flue gas from the gas driven compressor is sent to the carbon capture unit.

* * * * *